United States Patent [19]

Aronson

[11] 4,030,316

[45] June 21, 1977

[54] PASSIVE COOLER

[75] Inventor: Albert Irving Aronson, Princeton, N.J.

[73] Assignee: RCA Corporation, New York, N.Y.

[22] Filed: Dec. 11, 1975

[21] Appl. No.: 639,760

[52] U.S. Cl. .......................... 62/467 R; 62/DIG. 9
[51] Int. Cl.² ........................................ F25B 25/00
[58] Field of Search .......... 62/467, DIG. 1, DIG. 8, 62/DIG. 9; 165/47

[56] References Cited

UNITED STATES PATENTS

| | | | |
|---|---|---|---|
| 3,079,504 | 2/1963 | Hutchens | 62/DIG. 9 |
| 3,422,886 | 1/1969 | Buller | 62/467 |
| 3,875,435 | 4/1975 | Fletcher et al. | 62/467 |

Primary Examiner—Lloyd L. King
Attorney, Agent, or Firm—H. Christoffersen; Samuel Cohen; William Squire

[57] ABSTRACT

A three stage passive cooler for use in a spacecraft for cooling an infra-red detector includes a detector mounting cold plate for mounting the detector directly to the telescope optics. The telescope optics collect and direct the infra-red radiation from the earth, for example, to the infra-red detector, and are mounted directly to the spacecraft. The remaining stages of the cooler are mounted with thermal insulators to each other and to the spacecraft at separate locations from the detector mounting cold plate.

12 Claims, 1 Drawing Figure

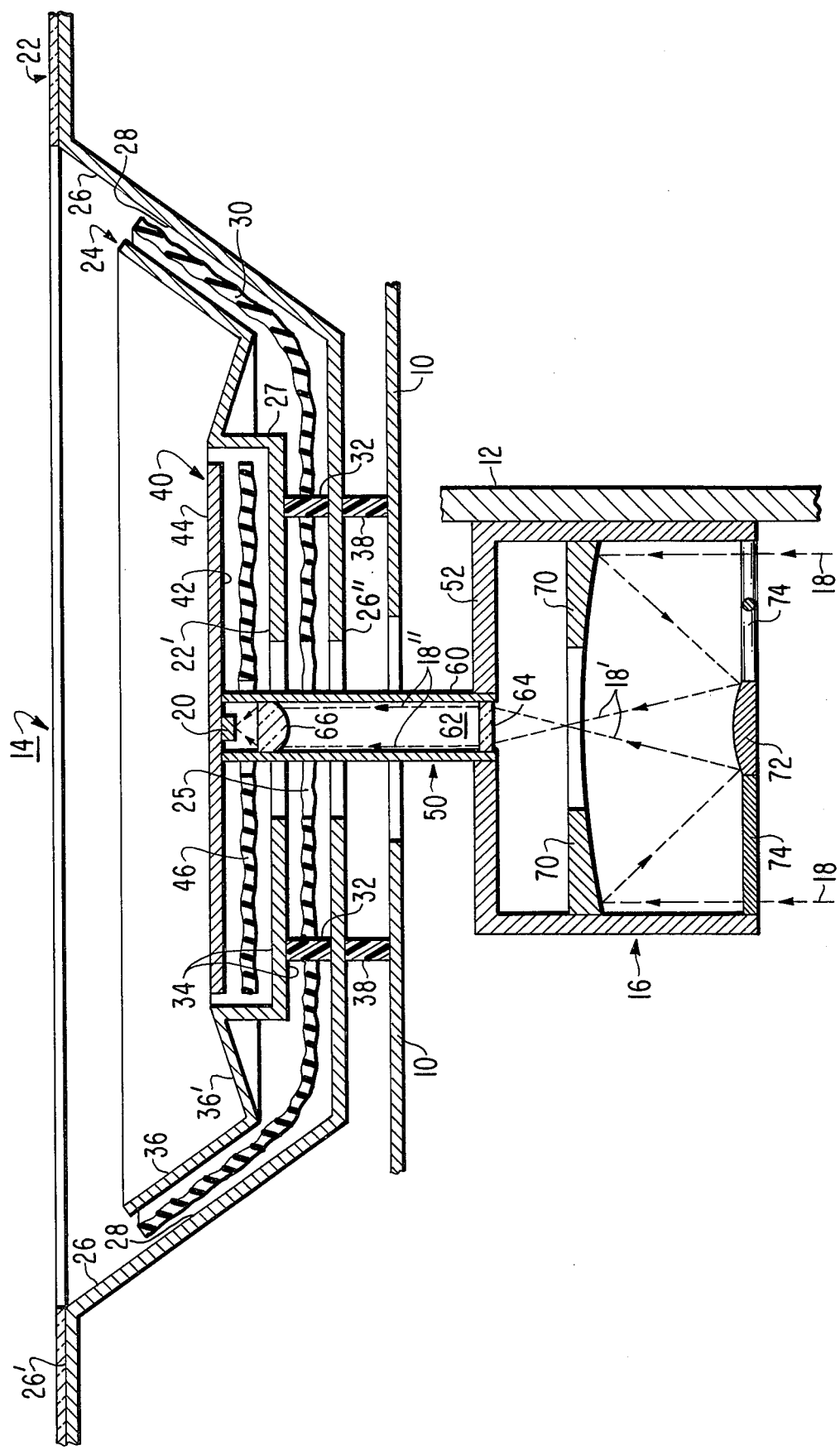

PASSIVE COOLER

The government has rights in this invention pursuant to Contract No. NAS 5-20074 awarded by NASA.

FIELD OF INVENTION

The present invention relates to passive coolers which are capable of cooling a supported article to a preselected temperature by radiation to the surrounding environment in the presence of wide band thermal radiation.

BACKGROUND OF THE INVENTION

Passive coolers are utilized for cooling sensitive radiation detectors which are operative at cryogenic temperatures, the detectors being used to scan the earth from an orbit position about the earth. Applications for such detectors are in the weather satellites now in use and satellite Laser communication systems.

One particularly suitable passive cooler is described and disclosed in U.S. Pat. No. 3,817,320 assigned to the assignee of the present invention. The cooler described in this patent utilizes a suspension system described in U.S. Pat. No. 3,727,865 also assigned to the assignee of the present invention. The cooler described in U.S. Pat. No. 3,817,320 is of the type that is useful for sensors having medium resolution (i.e 0.6 mr instantaneous field of view). In this respect, the suspension system described in U.S. Pat. No. 3,727,865 is extremely suitable. However, a problem arises when utilizing a cooler in much higher resolution systems such as might be used in a geosynchronous orbit. In such an orbit, the satellite is positioned about 22,000 miles above the earth and would require sensors with 0.1 mr instantaneous field of view or less. At that resolution the optics used to collect the light from the earth and direct the light to the infra-red detector needs to have, as will be appreciated, a high degree of accuracy and stability. The same requirement would hold for very high performance sensors orbiting 500–1000 miles above the surface of the earth for use in earth resource observation applications. For this reason the suspension system required to mount the infra-red detector needs to be extremely precise and mechanically stable to cooperatively operate with such increased precision in optics. Thus a stiffer system is required to mount the infra-red detector than that disclosed in U.S. Pat. No. 3,727,865.

However, such stiffer systems as utilized in the past include thermoplastic mounting insulators which exhibit creep and hysteresis. Such thermal mounts can be utilized to mount the outer stages or shields utilized in a passive cooler. Due to the precision alignment requirements of the optics and the infra-red detector, however, such prior art mounts are unsuitable for higher resolution sensors.

SUMMARY OF THE INVENTION

A passive device is arranged to be mounted on a support body for maintaining an optical article at a given temperature in the presence of a thermal radiation sink. The device includes an article cooling and supporting member having a high emissive surface exposed to the ambient for cooling the article thermally coupled thereto. A radiation shield member is disposed in spaced relation with respect to the supporting member for inhibiting the the impingement of thermal radiation on the supporting member. The shield member includes means for mounting the shield member on the support body thermally isolated from the body and supporting member. Optical means are arranged to be secured to the body for collecting selected radiation to be directed to the article. Means are provided connected to the supporting member and the optical means for directing the collected radiation to the article and for securing the supporting member to the optical means.

The sole drawing is a sectional view of a cooler constructed in accordance with an embodiment of the present invention.

DETAILED DESCRIPTION

In the drawing a spacecraft (not shown) includes a plurality of support members 10 and 12 for securing a passive cooler 14 and light collecting optics 16 to the spacecraft. Optics 16 is an extremely precise device for collecting infra-red radiation 18 from the earth. Optics 16 is essentially a high resolution telescope.

Mounted on the cooler 14 is a radiation detector 20 which receives radiation 18 collected by optics 16 to provide a suitable output signal as a measure of the received radiation. Infra-red detector 20 is one which is operative at cryogenic temperatures in a well known manner. The optics 16 are well known optics and their detailed construction need not be provided herein. Support members 10 and 12 represent supporting structure provided by the spacecraft or other devices which may be attached to the spacecraft. For example, members 10 and 12 may be part of a large housing surrounding the optics 16 except for a suitable optical aperture.

Suffice to say, due to the high resolution and accuracy of the optics 16 in focusing the radiation 18 and, in particular, the rays 18' on the detector 20, the mounting of the detector 20 must be extremely stiff. By stiff is meant motions of the detector 20 in the order of 0.001 inch or less. At the same time the detector 20 must be thermally isolated from the optics 16 so that the detector 20 is exposed only to the suitable cryogenic operating temperatures.

Cooler 14 comprises a plurality of nested, shielded stages 22 and 24 which can have different shapes depending on the orbit and sun angle. The cooler shown in the drawing is typical of that used in a geosynchronous application. The particular shape is not critical to and forms no part of the present invention. Each stage 22 and 24 comprises a relatively thin-walled sheet member made of aluminum or beryllium. Stage 22, first stage radiator has a silver coated surface 26 and a second surface mirror radiator 26' exposed to the ambient and a vapor deposited gold surface 28. Surface 28 is that surface which is exposed to and faces the stage 24.

Surface 26 is the inner surface of a frustroconical portion of stage 22 which portion extends from a planar disk member 26'' having a centrally disposed aperture. Surface 26' is disposed on a washer-like planar member which extends from the outermost edge of surface 26 parallel to member 26''. The second surface mirror forming surface 26' is further described and defined in the aforementioned U.S. Pat. No. 3,817,320. Disposed between stages 22 and 24 is a suitable thermal multilayer insulation blanket 30. This may be the type having vapor deposit gold on "H-film", a form of polyimide film manufactured by the DuPont Corporation. A plurality of polyimide films are separated by alternating layers of nylon net. The insulation blanket 30 serves to radiatively decouple stages 22 and 24 from each other. The blanket 30 extends between all opposing facing surfaces of stages 22 and 24. Stages 22 and 24 are mounted to each other by a suitable thermoplastic mounting ring 32. Mounting ring 32 provides mechanical support for stage 24 to stage 22 while conductively thermally isolating the two stages from each other. Such mounts are well known. The inner surfaces 34 of stage 24 facing stage 22 and member 40 are also vapor deposited gold. Vapor deposited gold has a solar absorbtivity $\alpha$ of about 0.5 and an infra-red emissivity E of about 0.05. Exposed surfaces 36 and 36' of stage 24 are silver and white paint respectively. The silver coated surfaces have a absorbitivity of $\alpha$ of 0.10 and infra-red emissivity E of 0.05.

Surface 36' is disposed on a washer-like member which depends downwardly toward member 26" from an upstanding annular wall 27 extending from the peripheral edge of washer-like inner portion 22' of stage 24. Surface 26 is disposed on the inner side of an annular frustro-conical member disposed approximately parallel to surface 26 on stage 22.

A second thermal ring 38 constructed similarly as ring 32 mounts stage 22 to the member 10 of the spacecraft. A cold plate 40, which mounts the detector 20 is a planar disk-shaped member disposed centrally at the base of the volume formed by stage 24 spaced from stage 24 member 22'. Member 40 is made of aluminum or beryllium. The inner surface 42 of member 40 facing stage 24 is also vapor deposited gold while the surface 44 facing the ambient is white paint. The paint used in cooler 14 has a solar absorbtivity $\alpha$ of 0.4 and an infra-red emissivity of about 0.85 at cryogenic temperatures. Disposed between the member 40 and stage 24 is a second thermal blanket 46 similar in construction to blanket 30.

Member 40 is mechanically and thermally isolated from stage 24 and stage 22 and the spacecraft member 10. As provided in accordance with the present invention, the member 40, however, is stiffly mounted to the spacecraft via suspension device 50 which is securely mounted to member 40 and to the optics 16 housing 52. Housing 52 in turn is securely mounted to spacecraft supporting member 12. Device 50 provides optical coupling between the optics 16 and infra-red detector 20, forming a relatively rigid and stiff support for the member 40 with respect to the optics 16 while providing thermal conductive isolation between the member 40 and optics 16, stages 22 and 24 and the spacecraft member 10 and 12.

The first stage 22 is arranged to reflect the solar energy with a single reflection so as to prevent any direct solar inputs into the second stage 24 and third stage (cold plate) member 40 and to prevent any earth infra-red or heat input to the cold plate member 40. A discussion of the purpose and definition of the second surface mirror forming radiator 26' is in the aforementioned U.S. Pat. No. 3,817,320. The second stage reflects the earth infra-red and earth reflected solar energy with a single reflection and prevents any earth reflected energy from reaching the cold plate member 40. The second stage 24 radiator cools the second stage to minimize radiation and conduction heat input to the member 40. Exposed inner conical surfaces, that is, those surfaces which can see each other and/or the member 40, are highly polished prior to finishing with gold or silver to achieve maximum specularity and to achieve minimum values of $\alpha$ and E. Rings 32 and 38 provide minimum thermal conductive coupling between the stages and provide sufficient strength and alignment during a launch environment.

Device 50 comprises a polycarbofil tube 60 having a relatively thin wall of approximately 0.05 to 0.1 inches. Tube 60 is preferably about five inches long and may be ½ to 2 inches in diameter. These dimensions are given only by way of example. Such a construction of the tube 60 provides thermal isolation between the member 40 and the housing 52 while providing relatively rigid support between member 40 and housing 52. Tube 60 is cemented with suitable cement at one end to the member 40 and at the other end into a suitable recess in housing 52. The end that is cemented to the member 40 provides a hermetic seal between the inner cavity of the tube 60 and the member 40 to prevent unwanted contaminants from entering the inner cavity 62 of tube 60. Disposed at the other end of tube 60 is a light collimating and transmission window 64 which collimates and transmits the radiation 18' from the optics 16 into the inner cavity 62 of tubular member 60. Window 64 can be a plain transparent window or an optical lens member, as in this case, whichever is suitable for a particular application. The window 64 receives the radiation 18' directed along the inner cavity longitudinal axis of member 60 and directs radiation 18'' to a lens 66 disposed adjacent the other end of member 60 and adjacent the detector 20. Lens 66 concentrates the directed radiation 18' onto the detector 20. The lens 66 need not provide a hermetic seal to the inner cavity as this has already been provided by the seal between tubular member 60 and member 40. The tubular member 60 provides relatively rigid support for the member 40 to the optic 16 housing 52 while providing thermal isolation therebetween. As a result, a relatively stiff optical relationship is maintained between the optics 16 and the detector 20 while providing good thermal isolation to detector 20 from the spacecraft and surrounding environment.

The optics 16 is schematically shown having a plurality of optic elements 70 and 72 for receiving and directing the radiation 18 onto the window 64. Element 74 is a structural member comprising a plurality of radially extending spaced spoke-like members that support element 72. These details do not form a part of the present invention. Any suitable optics or telescope arrangement may be utilized to concentrate and collect radiation from the earth to the window 64. To provide more accurate temperature control to infra-red detector 20, suitable heaters (not shown), may be employed which provide controlled temperature for detector 20.

The hermetically sealed cavity 62 of tubular member 60 prevents transmission degradation of the window 64 and lens 66 by contaminants in the ambient. The polycarbofil tubular member 60 has a coefficient of thermal conductivity of 0.005 W/in°K. While this construction is given as a preferred example, it will occur to those skilled in the art that other materials having similar structural and thermal characteristics are suitable for providing structural rigidity and thermal isolation to the member 40 via the housing 52.

Table 1 provides relative tube dimensions and wall thickness for various diameters of a polycarbofil tubular member 60 in a preferred embodiment. A 1 inch outside diameter tube having a 0.05 inch wall thickness has a conduction loss estimated to be about 32 milliwatts for a temperature gradient of 200° k between the optics 16 and cold plate member 40 for a tube length of about 5 inches. Table 1 provides conduction loss in watts -° K per inch × 10⁻⁵ for typical support tube member 40 cross sections having the dimensions shown.

TABLE 1

Conduction - Loss Watts - ° K - inch⁻¹ × 10⁻⁵ for Typical Support Tube Cross Sections

| Tube Outside Diameter inches | Wall Thickness - inches | | |
|---|---|---|---|
| | 0.05 | 0.075 | 0.1 |
| 0.5 | 39.2 | 58.9 | 78.5 |
| 1.0 | 78.5 | 117 | 157 |
| 2.0 | 157 | 235 | 314 |

It is to be understood that these conduction losses correspond to a given member 60 configuration which configuration is associated with a cooler having a selective cooling capacity determined in accordance with the relative size of stages 22, 24 and member 40. In practice, the relative conductive thermal losses attributed to member 60 is diminimus as compared to the selected cooling capacity of the cooler 14. In the embodiment illustrated, the member 40, for example has an outside diameter of about 12 inches, stage 22 has a 26 inch outside diameter and a 20 inch inside diameter and stage 24 has a 17 inch outside diameter. Surface 26 forms an angle of about 15° with the vertical (normal to member 40 surface 44). The height of the cooler from surface 26' to member 10 is about 7 inches. It is to be further understood that these dimensions are given by way of example illustrate the relative proportions between device 50 and the remainder of cooler 14 and not by way of limitation.

To increase the cooling capacity of cooler 14 all dimensions can be scaled such that the cooling capacity is increased by the square of the scaling factor, i.e., the ratio of the new dimensions to the original dimensions noted above herein. The device 50 need not be scaled and may remain in a given configuration for a variety of cooling capacities. The device 50 is constrained by optical considerations and the physical separation of the member 40 from optics 16 rather than by direct physical proportions of the various cooler members.

In the embodiment described herein, the polycarbofil tubular member 60 can be polycarbonate 40% glass reinforced having a specific gravity of about 1.51, a tensile strength of 18,000 psi and a tensile modulus of 17 × 17⁵ psi.

What is claimed is:

1. A passive device arranged to be mounted on a support body for maintaining an optical article at a given temperature in the presence of a thermal radiation sink comprising:
   an article cooling and supporting member having a high emissive surface exposed to the ambient for cooling said article thermally coupled thereto,
   a radiation shield member disposed in spaced relation with respect to said supporting member for inhibiting the impingement of thermal radiation on said supporting member, said shield member including means for mounting said shield member on said support body thermally isolated from said body and supporting member,
   optical means arranged to be secured to said body for collecting selected radiation to be directed to said article, and
   securing and optical coupling means connected to said supporting member and said optical means for directing said collected radiation to said article and for securing said supporting member to said optical means.

2. The device of claim 1 wherein said securing and optical coupling means is a tubular member including means for focusing said collected radiation at said supporting member.

3. The device of claim 2 wherein said tubular member includes a plurality of optical lenses secured in the core thereof, at least one of said lenses sealing said core from the ambient at one end of said tubular member, said supporting member sealing the other end of said tubular member from the ambient.

4. The device of claim 1 wherein said securing and optical coupling means includes a rigid member for rigidly securing said last-mentioned means to said optical means.

5. The device of claim 1 wherein said securing and optical coupling means includes a thin walled tubular member having negligible heat conductivity between said supporting member and said optical means.

6. A passive device including means for securing the device to a body for maintaining an article responsive to radiation in a given bandwidth at a predetermined temperature lower than said body, said device comprising:
   an article supporting member adapted to radiate thermal energy to the ambient,
   a radiation shield member disposed in spaced relationship with respect to said member and thermally isolated from said support member for shielding said support member from thermal radiation,
   means connected to said shield member for securing said shield member to said body,
   means for collecting radiation in said given bandwidth and adapted to be secured to said body, and
   radiation directing means secured to said collecting means and said support member for securing said support member to said radiation collecting means in thermal isolation from said radiation collecting means and for directing the radiation in said given bandwidth at said support member.

7. The device of claim 6 wherein said radiation directing means includes an optical member defining a space through which said radiation in said given bandwidth is transmitted and which space is hermetically sealed.

8. The device of claim 6 wherein said directing means includes means for rigidly connecting said support member to said radiation collecting means.

9. The device of claim 6 wherein said radiation directing means is an elongated tubular member adapted to exhibit negligible heat conduction between said support member and said radiation collecting means and for rigidly connecting said collecting means to said support member.

10. A passive device arranged to be mounted on a support body for maintaining an article responsive to radiation in a given bandwidth, at a predetermined temperature lower than said body comprising:
   a plurality of thermally isolated nested spaced members,
   at least one of said members including means for connecting that one member to said body in thermal isolation from said body,
   a second of said members supporting the article whose temperature is to be maintained, means exhibiting negligible thermal conductivity, rigidly connected to said second member providing the sole support for said second member for securing said second member to said body in thermally isolated spaced relationship with respect to said one member and said body, and means secured to said body for collecting and directing radiation at said article through said means exhibiting negligible thermal conductivity.

11. In a passive cooler including a plurality of thermally isolated stages including an article supporting member and cooling stage, a support member for the article cooling stage comprising:

a hollow tubular member including at least one member substantially transparent to radiation of interest sealing the cavity of said tubular member at one end from the ambient, said radiation of interest passing through said substantially transparent member and tubular member to the other end of said tubular member, said tubular member being constructed to provide thermal conductive isolation between the ends thereof, and means fixedly securing said other end of said tubular member to said cooling stage, said cooling stage serving to seal said cavity from the ambient at said other end, and said tubular member providing the sole support for said cooling stage.

12. A suspension member for securing a radiation focusing means to a radiation collecting member and for thermally isolating said radiation focusing means from said collecting member comprising:

an elongated tubular member the end portions of which are thermally isolated from one another, fixedly secured at one end to said collecting member and serving as the sole support therefor;

an element substantially transparent to the radiation of interest sealing the other end of said tubular member from the ambient;

means fixedly securing said radiation focusing means to said other end of said tubular member in a position such said radiation passes through said substantially transparent element and said tubular member to said collecting member, said tubular member thermally isolating said optical device from said collecting member; and means sealing said one end of said tubular member from the ambient.

* * * * *